United States Patent
Hey

(10) Patent No.: US 11,136,146 B2
(45) Date of Patent: Oct. 5, 2021

(54) PROPELLANT DELIVERY SYSTEM, ELECTRIC THRUSTER, AND METHOD OF OPERATING AN ELECTRIC THRUSTER

(71) Applicant: Airbus Defence and Space GmbH, Taufkirchen (DE)

(72) Inventor: Franz Georg Hey, Weingarten (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 0 days.

(21) Appl. No.: 16/633,982

(22) PCT Filed: Jul. 3, 2018

(86) PCT No.: PCT/EP2018/067977
§ 371 (c)(1),
(2) Date: Jan. 24, 2020

(87) PCT Pub. No.: WO2019/020330
PCT Pub. Date: Jan. 31, 2019

(65) Prior Publication Data
US 2020/0156809 A1    May 21, 2020

(30) Foreign Application Priority Data

Jul. 27, 2017 (DE) .......................... 102017212927.1

(51) Int. Cl.
*B64G 1/40* (2006.01)
*F03H 1/00* (2006.01)

(52) U.S. Cl.
CPC ............. *B64G 1/402* (2013.01); *B64G 1/405* (2013.01); *F03H 1/0012* (2013.01); *F03H 1/0031* (2013.01)

(58) Field of Classification Search
CPC .......... F03H 1/0012; F02K 9/58; B64G 1/402
See application file for complete search history.

(56) References Cited

U.S. PATENT DOCUMENTS 3,465,522 A * 9/1969 Work .................... F03H 1/0031
60/202
6,279,314 B1 8/2001 Valentian et al.
(Continued)

FOREIGN PATENT DOCUMENTS

| DE | 102014003261 | | 9/2015 |
|---|---|---|---|
| DE | 102014206945 | A1 | 10/2015 |
| FR | 2067420 | A5 | 8/1971 |

OTHER PUBLICATIONS

Brown "Further Experimental Investigations of a Cesium Hall-Current Accelerator" (Year: 1965).*
(Continued)

*Primary Examiner* — Arun Goyal
*Assistant Examiner* — William L Breazeal
(74) *Attorney, Agent, or Firm* — Greer, Burns & Crain, Ltd.

(57) ABSTRACT

An electric thruster comprises a propellant delivery system, wherein the propellant delivery system comprises: a pipe for carrying propellant; a valve which is adapted to adjust a volume or mass flow of the propellant in the pipe; and an expansion actuator which is adapted to actuate the valve for adjusting the volume or mass flow of the propellant. The electric thruster further comprises at least one tank which is adapted to receive propellant for the electric thruster; and a discharge chamber. The at least one tank thereby at least partially encloses an end of the discharge chamber and/or an element thermally coupled with the discharge chamber, and the valve of the propellant delivery system is arranged between the tank and the end of the discharge chamber.

11 Claims, 5 Drawing Sheets

(56) References Cited

U.S. PATENT DOCUMENTS

| | | |
|---|---|---|
| 6,609,363 B1 | 8/2003 | Dressler et al. |
| 9,334,855 B1 | 5/2016 | Hruby et al. |
| 9,746,092 B2 | 8/2017 | Wolf et al. |
| 2013/0026920 A1* | 1/2013 | Szabo, Jr. .............. B64G 1/405 |
| | | 315/111.41 |

OTHER PUBLICATIONS

Klintberg "A thermally activated paraffin-based actuator for gas-flow control in a satellite electrical propulsion system" (Year: 2003).*

International Search Report; priority document.

German Search Report; priority document.

R. Worlock et al., "An Advanced Contact Ion Microthruster System," Journal of Spacecraft and Rockets, vol. 6, No. 4 (1969) pp. 424-429.

K. Polzin et al., "Propulsion System Development for the Iodine Satellite Demonstration Mission," Jul. 4, 2015; http://erps.spacegrant.org/uploads/images/2015Presentations/IEPC-205-09_ISTS-2015-b-09.pdf, p. 6.

K. Polzin et al., "Development, Demonstration, and Analysis of an Integrated Iodine Hall Thruster Feed System," AIAA Propulsion and Energy Forum 2016; Jul. 25, 2016, p. 3.

* cited by examiner

PROPELLANT DELIVERY SYSTEM, ELECTRIC THRUSTER, AND METHOD OF OPERATING AN ELECTRIC THRUSTER

CROSS-REFERENCES TO RELATED APPLICATIONS

This application claims the benefit of the German patent application No. 102017212927.1 filed on Jul. 27, 2017, the entire disclosures of which are incorporated herein by way of reference.

FIELD OF THE INVENTION

The invention relates to an electric thruster having a propellant delivery system for an aerospace system, and to a method of operating an electric thruster for an aerospace system.

BACKGROUND OF THE INVENTION

Various enterprises and universities have been developing electric thrusters, for example for use in an aerospace system, for a number of decades. For this purpose, the electric thrusters comprise a plasma accelerator arrangement in which a propellant in the gaseous state is ionized (plasma generation) and introduced into a discharge chamber. In the discharge chamber, the propellant ions are accelerated by means of electric and/or magnetic fields and ejected, whereby a thrust is exerted on the thruster.

In hitherto existing thrusters, xenon gas is used because it represents a suitable propellant on account of its relatively high atomic mass and good discharge properties. However, the use of xenon is accompanied by high costs for the production of the xenon gas and the need for pressure tanks. In addition to the associated propellant and system costs, such a system cannot usually be carried on rockets as a secondary payload owing to the line pressure.

SUMMARY OF THE INVENTION

In aerospace research, simple microthrusters which operate in the micronewton range have been developed for future research missions but also for small satellite constellations. In order to reduce the costs of such thrusters and to avoid the disadvantages of storing xenon as the propellant, iodine is being considered as an alternative propellant. The atomic mass, ionization energy and effective cross-section of iodine are comparable with those of xenon. Indeed, because iodine can be stored in the form of a solid body, the pressure tank and pressure reducer that are necessary in the case of xenon are not required. However, in order to operate an electric thruster, the iodine must first be brought into the gaseous state and delivered to the thruster in the gaseous state.

An object underlying the invention is to provide a propellant system for an electric thruster which can be implemented cost-effectively and where possible without additional weight, and which is also energy-efficient and easy to control.

For this purpose, the invention teaches a propellant delivery system for an electric thruster of an aerospace system, wherein the propellant delivery system comprises:
  a pipe for carrying propellant,
  a valve which is adapted to adjust a volume or mass flow of the propellant in the pipe, and
  an expansion actuator which is adapted to actuate the valve for adjusting the volume or mass flow of the propellant.

The expansion actuator comprises a material which changes its volume as a result of a change in temperature. For example, the material of the expansion actuator can expand when it is heated. The expansion actuator can contain paraffin, metal, oil and/or a bi-metal as the expansion material.

The expansion actuator can be adapted to leave the valve in a closed position at a reference temperature and to move the valve continuously as far as an open position when heated (at a temperature greater than the reference temperature), that is to say, to actuate the valve for adjusting the volume or mass flow of the propellant. The expansion actuator can be adapted also to actuate the valve in the opposite direction, that is to say, to close the valve and stop the volume or mass flow of the propellant, in the case of a cooling operation and, in particular, when the reference temperature is reached. Alternatively or in addition, the valve and/or the expansion actuator can be equipped with a return mechanism which moves the valve into the closed position. For example, the valve and/or the expansion actuator can comprise a spring element or another biased element which is connected to the valve by a force-based connection.

The use of an expansion actuator for actuating the valve has the advantage that any desired heat source can be used to actuate the valve. For example, the expansion actuator allows the heat generated by a heating device which is activated on starting or ignition of the thruster and/or the waste heat of the electric thruster to be used to bring the valve into an open position and hold it there.

The expansion actuator can additionally be equipped with an active cooling element. Actuation of the valve into its closed position can thereby actively be effected also during operation of the thruster. Since an active cooling element represents additional weight, it is only to be provided in cases where rapid closing of the valve is necessary.

In an implementation variant of the propellant delivery system, the propellant delivery system comprises a heater which is arranged in and/or around the pipe. The heater can be adapted to deliver thermal energy to the pipe and/or to the propellant on and/or in the pipe. The propellant can thereby be converted into the gaseous state and kept in the gaseous state by the thermal energy delivered by the heater. As a result of being converted into the gaseous state, the propellant expands and is able to flow through the pipe. In particular when the valve is open, the expanding propellant is able to move through the valve to a thruster. The heater further heats by delivering (at least a portion of) the thermal energy it generates to the pipe and thus prevents the propellant from condensing on and in the pipe.

In a further implementation variant of the propellant delivery system, the pipe is made of a thermally conducting material, such as, for example, aluminum, steel or aluminum nitride. Owing to the thermal conductivity of the pipe, it is also possible to transmit heat from the heater via the pipe to the expansion actuator if the expansion actuator is so arranged that it is thermally coupled at least in part with the pipe. The propellant delivery system can as a result be operated in an energy-efficient manner and, owing to the simple configuration, is also cost-effective to produce. For example, a separate heat source for the expansion actuator is not required.

Alternatively or in addition, the propellant delivery system can comprise a plurality of pipes. The pipes can each be coupled with a separate valve which adjusts the volume or mass flow of the propellant in the pipe in question. The plurality of pipes can, of course, be connected to one another and coupled with a single valve which is adapted to adjust the volume or mass flow of the propellant in all the pipes. For example, the pipes can branch from the valve in a tree-like manner.

The invention also teaches an electric thruster of an aerospace system which comprises a propellant delivery system in any described form. The electric thruster further comprises at least one tank, which is adapted to receive propellant for the electric thruster, and a discharge chamber. The propellant delivery system is coupled with the tank or integrated therein at least in part, so that the propellant delivery system is able to deliver propellant from the tank to the discharge chamber. The discharge chamber has on one side a plasma ejection opening from which the accelerated plasma for generating thrust is ejected. The at least one tank at least partially encloses an end of the discharge chamber and/or an element thermally coupled with the discharge chamber. The end of the discharge chamber can be the end of the discharge chamber opposite the plasma ejection opening. Alternatively, any other end or any desired side of the discharge chamber can also be used for the arrangement of the tank. The tank can further be arranged around the entire thruster structure.

In an implementation variant, the tank is arranged at the point of the discharge chamber at which the greatest amount of waste heat of the electric thruster is generated. The waste heat of the electric thruster can thereby be used to heat the propellant in the tank and contribute towards bringing the propellant into the gaseous state, or take over that function completely. The tank can thus remain unheated, that is to say, can be implemented without its own (active) heating device. As a result, thermal conductivity of the tank walls, at least in the region in which the tank is not thermally coupled with the other components of the electric thruster, as is otherwise necessary, is also not required. For example, the tank walls in those regions can be made of plastics material or ceramics. Compared with thermally conductive tank walls, for example made of metal, which are otherwise necessary, further weight can thus be saved. The use of plastics material or ceramics also enables propellants to be used which would react with metal-containing materials.

Furthermore, tank walls can be omitted in the region in which the tank is thermally coupled with components of the electric thruster. In particular, when a propellant is used in the form of a solid body, no pressure is exerted by the propellant on the tank walls or other tank boundaries, so that the tank can be delimited by the components of the electric thruster.

As a result of the conversion of the propellant into the gaseous state, the propellant expands and is able to escape from the tank through the pipe of the propellant delivery system. For example, the propellant changes directly from the solid to the gaseous state via sublimation. The propellant, as a result of its expansion, is thereby able to flow through the (open) valve to the discharge chamber.

In a further implementation variant, the valve of the propellant delivery system is arranged between the tank and the end of the discharge chamber at which the tank is located. If the tank is not delimited by separate tank walls in that region, the valve of the propellant delivery system can also be arranged directly in the tank in the vicinity of the end of the discharge chamber. As a result, the transport path of the propellant through the propellant delivery system is shortened, whereby weight and costs due to unnecessary line run can be saved. In addition, the valve is heated by the waste heat of the electric thruster, whereby condensation of the propellant in the valve is prevented. Such a construction permits a particularly compact electric thruster.

The at least one tank can have any desired form and comprise any desired number of individual tanks. Each individual tank can be equipped with one or more propellant delivery systems. Alternatively, a plurality of individual tanks can also be connected with one another by a single pipe of a propellant delivery system.

According to one implementation variant of the electric thruster, the element thermally coupled with the discharge chamber is a thermally conducting pipe for carrying propellant to the discharge chamber. The thermally conducting pipe can connect the valve of the propellant delivery system to the discharge chamber, for example. Alternatively, the element thermally coupled with the discharge chamber is a portion of the pipe of the propellant delivery system. The valve of the propellant delivery system can thereby be arranged at any point of the pipe of the propellant delivery system between the tank and the discharge chamber. The closer the valve is arranged to the discharge chamber, the more easily can waste heat of the discharge chamber be used for actuating (opening) the valve by the expansion actuator.

The electric thruster can be a radio-frequency thruster, heli-coil thruster or magneto-plasma thruster, that is to say, a thruster without an anode. Alternatively, the electric thruster can be a thruster with an anode, such as, for example, a cusp-field thruster, Hall-effect thruster or Kaufmann thruster.

In the case of a thruster comprising an anode, the thruster can comprise a thermally conducting insulator which is coupled with the anode. The element thermally coupled with the discharge chamber can comprise the insulator or be the insulator. As a result, the insulator is able to take up waste heat of the electric thruster (for example via the anode) and, owing to its thermal conductivity, transmit it to other components. In a further implementation variant of the electric thruster, the insulator is made of a thermally conducting material, such as, for example, aluminum nitride or boron nitride.

The insulator can optionally comprise an opening for carrying propellant to the anode. Because the insulator is heated by the waste heat of the electric thruster, condensation of the propellant carried through the opening of the insulator is prevented. The opening of the insulator can also have a coating in order to prevent the propellant from reacting with the insulator material. The coating can be a plastics material or ceramics coating, for example. By integrating (a portion of) the propellant guide or line in the insulator, not only is weight saved, due to a smaller number of necessary components, but the size of the electric thruster is also reduced.

In a further implementation variant, the valve and/or the expansion actuator of the propellant delivery system is/are arranged in and/or on the insulator. In other words, at least a portion of the valve and/or at least a portion of the expansion actuator is mounted in the insulator and/or on the insulator, so that waste heat of the electric thruster transmitted by the thermally conducting insulator also heats the valve and/or the expansion actuator. Condensation of the propellant in the valve is also prevented thereby. When the expansion actuator is heated by the waste heat of the electric thruster, it is possible, after ignition of the thruster (and, in particular, after the operating temperature of the thruster has been reached) to keep the valve in the open position in a particularly energy-efficient manner without activating the expansion actuator by a different heat source.

In another implementation variant, the electric thruster comprises a filter which is arranged in the opening of the insulator and/or in the thermally conducting pipe or the portion of the pipe of the propellant delivery system. The filter serves for filtering solids out of the propellant which is delivered in the gaseous state to the electric thruster. In other words, the filter isolates the propellant gas from the plasma in the discharge chamber or from the anode. The filter can be arranged upstream or downstream of the valve in the direction of flow of the propellant. The closer the filter is arranged to the discharge chamber, the more easily can final solid particles of the propellant on the filter be converted into the gaseous state.

The electric thruster can further comprise an anode heater which is adapted to heat the anode for ignition of the electric thruster. The anode heater serves, in particular, for heating all parts of the electric thruster which come into contact with propellant before the start (ignition of the thruster), in order to prevent condensation. In addition, any propellant which is still in the propellant lines (from the last operation) and may be in the solid state is heated and brought into the gaseous state. In the event that the electric thruster does not comprise an anode, a heater can likewise be provided for heating the components of the electric thruster that come into contact with the propellant and for preventing condensation of the propellant and/or allowing conversion of the propellant into the gaseous state.

In a further development, the anode heater can be adapted and so arranged that it heats the expansion actuator of the propellant delivery system indirectly or directly. For example, the anode heater can be directly thermally coupled with the anode and the expansion actuator. Alternatively, the anode heater can be indirectly thermally coupled with the anode and/or the expansion actuator via a further element, such as, for example, the insulator, whereby thermal energy is transmitted indirectly. Before the electric thruster is started, the anode heater can heat the expansion actuator so that it in turn actuates (opens) the valve of the propellant delivery system and enables the volume or mass flow of the propellant through the pipe of the propellant delivery system. This permits a further weight and cost saving since only the anode heater is necessary for bringing the electric thruster into an ignitable state.

According to one implementation variant, the electric thruster can comprise a multiple of one or more components in order to create safety-relevant redundancies. For example, the electric thruster can comprise two or more complete propellant delivery systems which are able to deliver propellant to the discharge chamber from one or more tanks. Alternatively or in addition, the propellant delivery system of the electric thruster can comprise two or more valves which are able to adjust the volume or mass flow of the propellant from the (possibly single) pipe of the propellant delivery system in parallel with one another. Likewise alternatively or in addition, the propellant delivery system of the electric thruster can comprise two or more expansion actuators which actuate one (possibly a single) or more valves. Operation of the thruster is thereby ensured even if a component of the propellant delivery system fails.

Once the electric thruster has ignited and is producing sufficient heat, the anode heater can be switched off (deactivated). The valve remains open via the expansion actuator, which continues to be heated by the waste heat of the electric thruster. The electric thruster can thus also be operated in an energy-efficient manner.

The pipe of the propellant delivery system can also project from the valve into the at least one tank. The heater provided in and/or on the pipe can thereby generate heat which is transmitted into the tank by radiation. This is particularly advantageous if the propellant is able to move arbitrarily in an interior of the tank in a microgravity environment (for example in outer space) and, for example, is not in direct contact with the pipe of the propellant delivery system.

By arranging the tank at or in the vicinity of the discharge chamber so that waste heat of the electric thruster is transmitted into the tank, the conversion of the propellant in the tank into the gaseous state is facilitated. The heater provided in and/or on the pipe can thus be operated with a lower heating capacity, so that the energy efficiency of the electric thruster is further improved.

In order to prevent positive back-coupling of the system, that is to say, in order to prevent burning operation of the thruster from being automatically maintained, the heater in and/or on the pipe can be so dimensioned that it is operated subcritically. In other words, the heater is so dimensioned (in size and heating capacity) that the switching off of the heater reduces or terminates the generation of gaseous propellant in the tank and/or in the pipe. Since the conveying of propellant from the tank is thus gradually reduced, the waste heat output of the electric thruster also falls, whereupon less waste heat is transmitted into the tank and the expansion actuator. Finally, the thruster extinguishes as a result of the valve being closed by the cooling expansion actuator and/or too small an amount of gaseous propellant being generated in the tank and the pipe of the propellant delivery system.

The electric thruster can further be so configured that the tank and/or the propellant delivery system is/are thermally coupled with at least one further waste-heat-generating element of the electric thruster and/or of the aerospace system. Additional waste heat of the aerospace system or of the electric thruster can thus be used to heat the propellant in the tank and/or at least portions of the propellant delivery system.

For example, one implementation variant can provide that a power converter necessary for operation of the thruster (for example, a voltage inverter, DC-DC converter, an associated controller, etc.) is thermally coupled indirectly and/or directly with a component of the propellant delivery system, with the tank and/or with another element of the electric thruster. The waste-heat-generating element of the electric thruster can thus be arranged, for example, next to the tank in order to be able to utilize electrical conversion losses (waste heat) efficiently for heating the propellant. Alternatively or in addition, the waste-heat-generating element of the electric thruster can be so arranged that the valve, the expansion actuator, the anode, the insulator, etc. is heated. The overall efficiency of the electric thruster can thereby be increased further. Other waste-heat-generating elements such as processors or the like can of course also be thermally coupled with the tank and/or the propellant delivery system.

In one implementation variant of the electric thruster, iodine is used as the propellant. Since iodine can be stored as a solid or solid body, a pressure-resistant tank, as is necessary in the case of xenon, for example, is not required. The electric thruster can thus be made lighter, whereby costs and energy are saved. Limitations as a secondary payload are also reduced due to the absence of pressure lines. Iodine has the further advantage that it can be brought directly into the gaseous state by sublimation. This allows the amount of heat which must be applied by heating elements or which must be supplied to the propellant by the waste heat of the electric thruster to be reduced. The amount of heat for heating the propellant-carrying elements of the electric thruster in order to prevent condensation is also small when iodine is used. For example, depending on the vacuum pressure, the parts of the electric thruster only have to be heated to temperatures between 60° C. and 120° C.

The propellant delivery system and/or the electric thruster can of course also be used for/with other propellants. For example, the propellant delivery system and/or the electric thruster can be operated with various noble gases, such as argon or krypton, but also with other substances, such as oxygen, nitrogen, mercury, etc. Although in the case of certain gases as propellant, the propellant can only be stored in a pressure-resistant tank, the other advantages of the propellant delivery system and of the electric thruster, in particular, the use of waste heat for conveying the propellant and for operating the electric thruster, or the weight saving due to a smaller number of structural elements and components, remain.

A further weight saving can be achieved by casting the iodine to form structural elements of the tank. For example, iodine (as a solid body) can form a certain portion of the bearing structure of the tank, so that the tank can be made lighter (i.e., more filigree).

Furthermore, further thruster structures can at least partially be replaced by corresponding shaping of the iodine. The thruster structures are mostly designed for the loads during launching into orbit, that is to say, under gravity. During operation, that is to say, when the propellant is being consumed, there is mostly a microgravity environment, so that bearing parts do not have to be as strong and the consumption of the iodine by the thruster, and the associated "weakening" of the bearing parts formed by iodine, do not have any adverse effects on the stability of the thruster structures.

The invention further teaches a method of operating an electric thruster of an aerospace system, wherein the method comprises:
- providing an electric thruster according to one of the described implementations and variants,
- activating the anode heater until the anode has reached an operating temperature and the expansion actuator has opened the valve in order to enable the volume or mass flow of the propellant from the pipe of the propellant delivery system to the anode,
- igniting the electric thruster, and
- deactivating the anode heater when the expansion actuator is being heated by waste heat of the electric thruster.

Ignition of the thruster can take place either via a voltage which is permanently applied to the anode or by applying the voltage once the nominal mass flow of propellant has been reached. The thruster can be switched off either slowly by deactivating the heater or by switching off the power supply (anode voltage). In an electric thruster without an anode, the operation of switching on and off can be carried out in an equivalent manner by controlling one or more actuators (e.g., for generating grid voltages, RF field generators, etc.) associated with the thruster.

By deactivating the anode heater, the electric thruster can be operated in an energy-efficient manner Since only a thrust in the region of millinewtons is often achieved in the case of electric thrusters, the burning time is often in the region of minutes, hours or days (possibly even months). The period of time which elapses between activation and deactivation of the anode heater is often only in the region of seconds or a few minutes, so that the energy outlay of the anode heater in relation to the burning time of the thruster is negligible.

An otherwise conventional actuation of the valve mostly requires further components, such as, for example, servo-motors and a controller therefor, which have a significantly greater weight than an expansion actuator. Accordingly, weight can be saved, on the one hand, and the electrical energy outlay for actuating the valve can be reduced, on the other hand. The complexity of the system and the number of electrical interfaces are likewise reduced. This can result in an additional weight saving and in low costs.

In a further implementation variant, the method comprises activating the heater of the propellant delivery system, wherein the propellant in the tank is converted into the gaseous state as a result of heat transfer by radiation from the heater. For example, the propellant can change to the gaseous state by sublimation when the solid propellant is exposed to the thermal radiation. By controlling the heater (controlling the amount of heat given off by the heater), the amount of gaseous propellant which flows to the discharge chamber of the electric thruster can be determined, so that the thrust of the electric thruster can be changed (that is to say, controlled).

For example, the thrust performance can be controlled via the volume or mass flow leaving the tank, which is proportional to the heat output of the heater in the tank. The more heat output (thermal energy) passes into the tank, the more gaseous propellant flows in the direction towards the anode. The thrust performance can therefore be adjusted via the heat output, so that an otherwise conventional separate mass flow regulator with an associated control component is superfluous and further weight can thus be saved.

The method can further comprise the step of deactivating the heater of the propellant delivery system when the electric thruster is switched off. By deactivating the thermal radiation of the heater, the process of sublimation of the propellant in the tank is reduced or even terminated. Because of the reduction or termination of the propellant sublimation, less and less propellant is able to flow from the tank to the discharge chamber. The waste heat output of the electric thruster thereupon also falls, so that even less propellant is conveyed and the expansion actuator also cools down and closes the valve. Finally, the thruster extinguishes.

When the thruster is switched off, a certain amount of propellant may escape through a valve which may still be open, even though the thrust performance of the thruster has to be reduced. However, the thrust performance of the thruster is controlled predominantly by controlling the electric and/or magnetic field/fields in the discharge chamber. The loss of the possibly unused (not converted into plasma) iodine can, however, be disregarded because of the otherwise very energy-efficient operation of the thruster.

BRIEF DESCRIPTION OF THE DRAWINGS

Exemplary implementations of the invention are described in greater detail below with reference to the drawings.

DETAILED DESCRIPTION OF THE PREFERRED EMBODIMENTS

Figure 1:
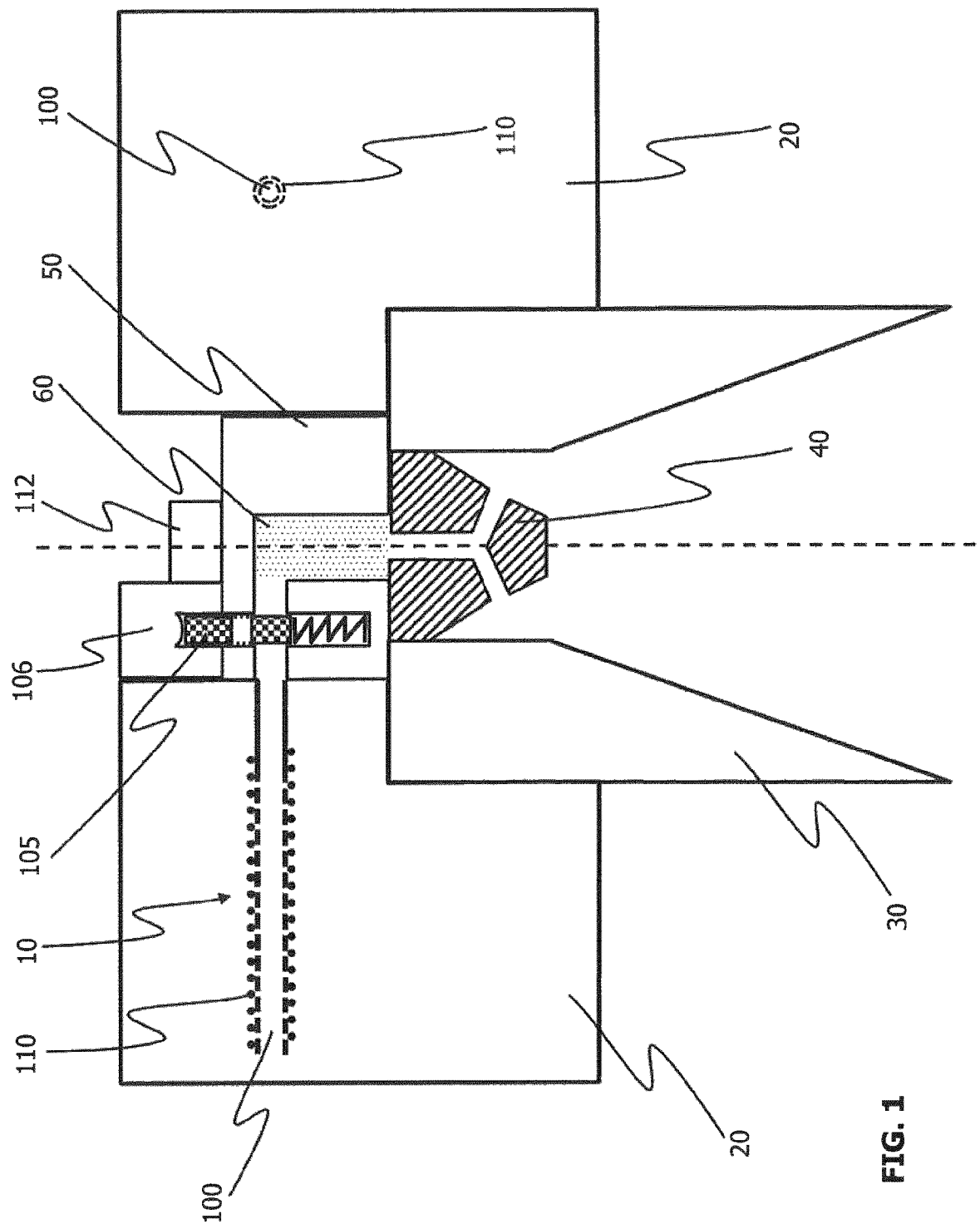
FIG. 1 shows, schematically, an electric thruster with the valve closed.

According to the invention described herein, a propellant delivery system 10 for an electric thruster is provided. The propellant delivery system 10 comprises a pipe 100 for carrying propellant from a tank 20 of the electric thruster. The pipe 100 leads to a valve 105 which is able to adjust a volume or mass flow of the propellant in the pipe 100. The volume or mass flow of the propellant in the pipe 100 can be changed depending on the degree of opening of the valve 105. For controlling the valve 105, that is to say, for actuating the valve between a closed position and an open position, an actuator 106 is connected to the valve 105 by a force-fit connection. The actuator can be in the form of an expansion actuator 106, an expansion material in the expansion actuator 106 expanding by heating and thereby actuating the valve 105 as a result of the force-based connection thereto.

The propellant delivery system 10 can further comprise a heater 110. The heater can be arranged, for example, on and/or around the pipe 100. Propellant in the tank 20 is heated by the thermal energy delivered by the heater 110. The propellant in the tank 20 can be in the form of a solid body and can sublime directly by the influence of the thermal energy from the heater 110. Iodine, for example, which can be stored as a solid body and, owing to its vapor pressure curve, can be converted directly from the solid to the gaseous state of aggregation, can be used as the propellant. The heater 110 can deliver its thermal energy by radiation. Propellant in the tank 20 can thereby be heated, or sublime, even in a microgravity environment, as is present in outer space.

When the propellant changes to the gaseous state, it expands and escapes from the tank 20 via the pipe 100 when the valve 105 is open. For this purpose, the pipe 100 projects from the valve 105 into the tank 20 and, on the outside of the pipe 100, is connected in a gas-tight manner to a wall of the tank 20. Inside the tank 20, the pipe 100 can have one or more openings through which gaseous propellant is able to flow into the interior of the pipe 100 and is able to flow out of the tank when the valve 105 is open.

FIG. 1 shows a tank 20 which is arranged rotationally symmetrically about the electric thruster. This is particularly space-saving and energy-efficient, in particular, in the case of thrusters which are mostly round. A pipe 100 can be provided in the tank 20. For example, the pipe 100 meanders through the tank, which is therefore shown in cross-section in the right-hand region of FIG. 1 and is shown as a longitudinal section in the left-hand region of FIG. 1. A heater 110 for heating and/or subliming the propellant in the tank 20 can be provided around at least a portion of the pipe 100 in the tank.

The electric thruster can of course have more than one tank 20, which tanks are arranged at least in part around the electric thruster. Accordingly, the tank 20 shown on the right in FIG. 1 can alternatively be a separate tank 20. The pipe 100 in the tank shown on the right can either be coupled with its own valve (not shown) for closing and opening the pipe 100, or it is connected to the pipe 100 of the tank 20 shown on the left in FIG. 1 upstream of the valve 105 in the direction of flow of the gaseous propellant. Independently of the number of tanks 20 provided, one or more pipes 100 with or without heaters 110 can be provided in each tank 20 for carrying the required amount of gaseous propellant from the tanks to the electric thruster.

The electric thruster further comprises a discharge chamber 30 in which one or more electric and/or magnetic fields are generated. By means of these fields, the gaseous propellant is ionized (plasma generation), accelerated and ejected from an opening of the discharge chamber 30 which can be seen at the bottom in FIG. 1.

By way of example, FIG. 1 shows an electric thruster with an anode 40 which serves for generating plasma and accelerating the propellant. Such thrusters are, for example, cusp-field thrusters, Hall-effect thrusters or Kaufmann thrusters. The propellant delivery system 10 described herein can of course also be used in an electric thruster without an anode 40, for example a radio-frequency thruster.

At one end of the discharge chamber 30 there is an element 50 which is thermally coupled with the discharge chamber 30. This element 50 can be a further pipe portion of the pipe 100 of the propellant delivery system 10. Alternatively or in addition, this element 50 can be a separate propellant line which connects the valve 105 to the discharge chamber 30. Likewise alternatively, the element 50 can be an insulator 50 which is coupled with the anode 40 and electrically insulates it. The insulator 50 can comprise an opening for carrying propellant from the tank 20 to the anode 40.

A filter 60 can be arranged in the opening of the insulator 50 and/or in the thermally conducting pipe or the portion of the pipe 100 of the propellant delivery system 10. The filter 60, which can be in the form of a frit, a labyrinth or a ceramics sponge, serves for isolating the propellant gas with respect to the anode 40 or the plasma generated in the discharge chamber 30.

The thermally coupled element 50, for example the insulator 50, is thermally conducting, so that waste heat from the electric thruster can be carried by the element/insulator 50 to further components.

For example, the element/insulator 50 is thermally coupled with the at least one tank 20 in order to heat propellant in the at least one tank 20 and facilitate or achieve sublimation of the propellant.

Furthermore, the valve 105 of the propellant delivery system 10 can be arranged between the tank 20 and the end (or side) of the discharge chamber 30. In FIG. 1, the valve 105 is arranged in the element/insulator 50. Heating of the valve by the thermal energy conducted by the element/insulator 50 can thereby be utilized to reduce/prevent condensation of the propellant.

In addition to or instead of the valve 105, the expansion actuator 106 of the propellant delivery system 10 can also be arranged in and/or on the element/insulator 50. Waste heat can thus be conducted to the expansion actuator 106 via the element/insulator 50 during operation of the thruster, whereby the expansion actuator actuates the valve 105.

FIG. 1 further shows an anode heater 112 which is provided for heating the element/insulator 50. In particular, in the start phase, that is to say, before ignition of the electric thruster, the element/insulator 50 and optionally the anode 40 or a correspondingly different component of the electric thruster at the end of the discharge chamber 30 at which the propellant is introduced is heated.

The expansion actuator 106 of the propellant delivery system 10 and/or the anode heater 112 can be so adapted and arranged that the anode heater 112 also heats the expansion actuator 106 indirectly or directly. The anode heater 112 (or another heat source) is activated in particular in the start phase of the electric thruster, that is to say, before ignition of the electric thruster.

Figure 2:
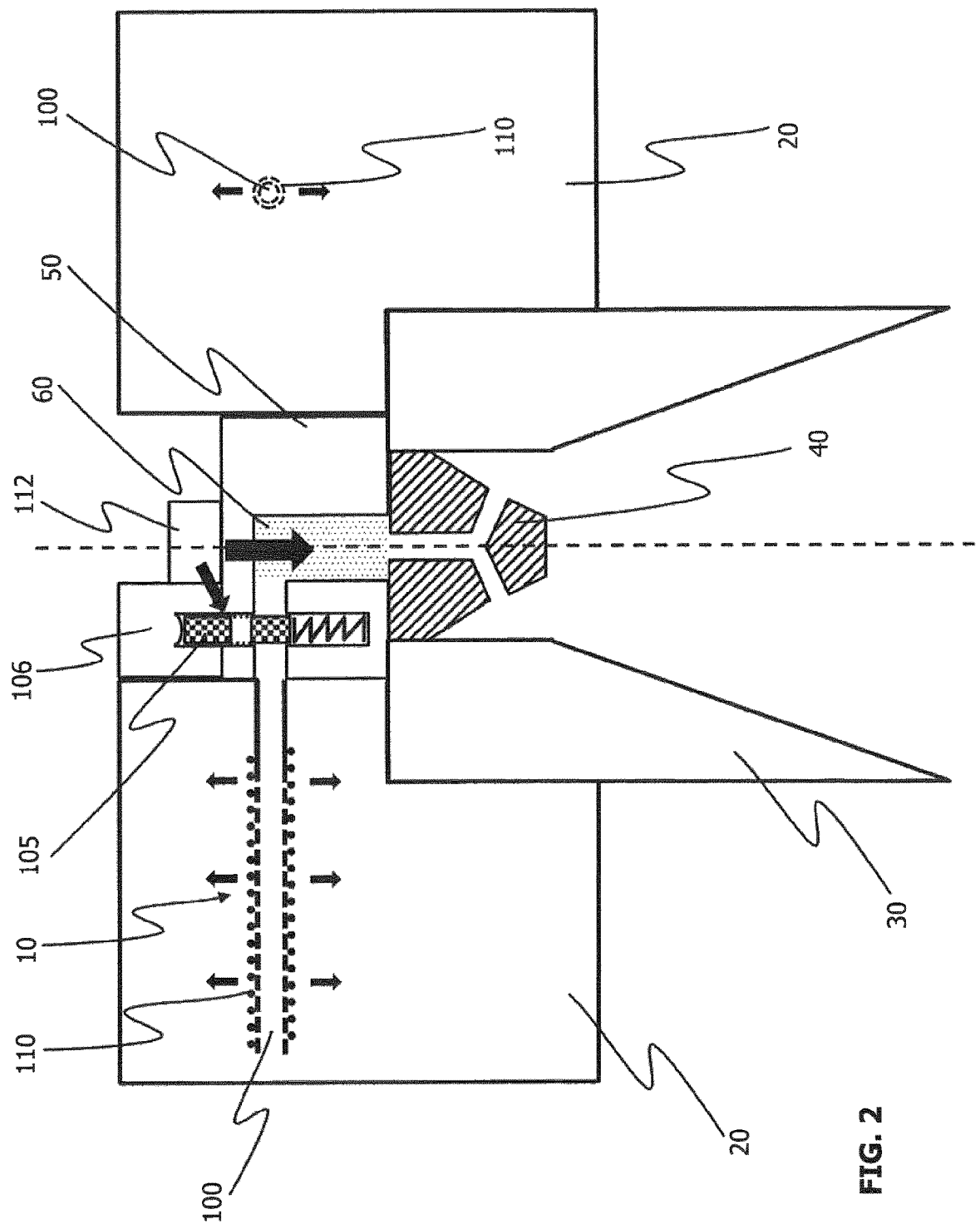
FIG. 2 shows, schematically, heat flows during operation of the electric thruster of FIG. 1.
Figure 3:
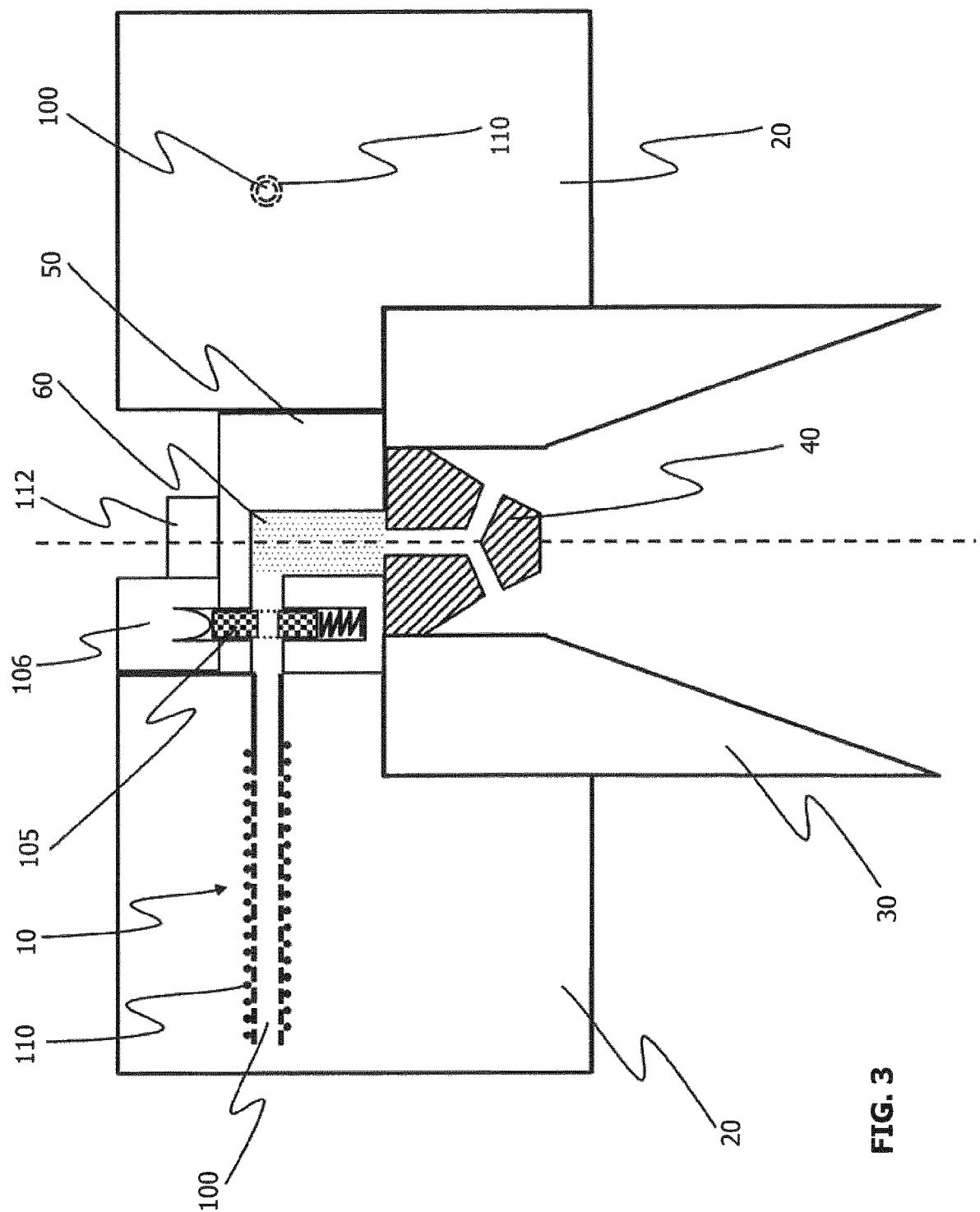
FIG. 3 shows, schematically, the electric thruster of FIG. 1 with the valve open.
Figure 4:
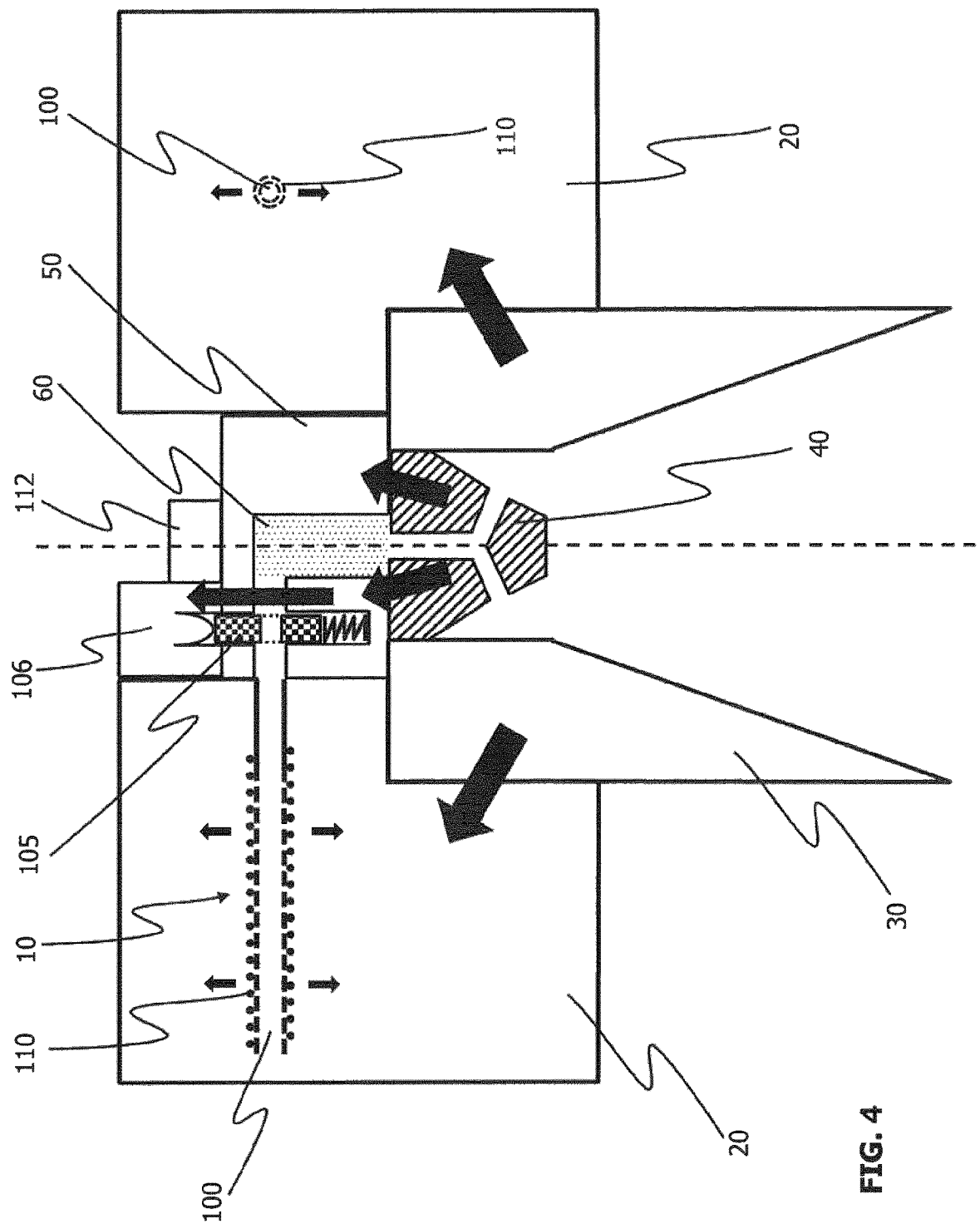
FIG. 4 shows, schematically, heat flows during operation of the electric thruster of FIG. 3.
Figure 5:
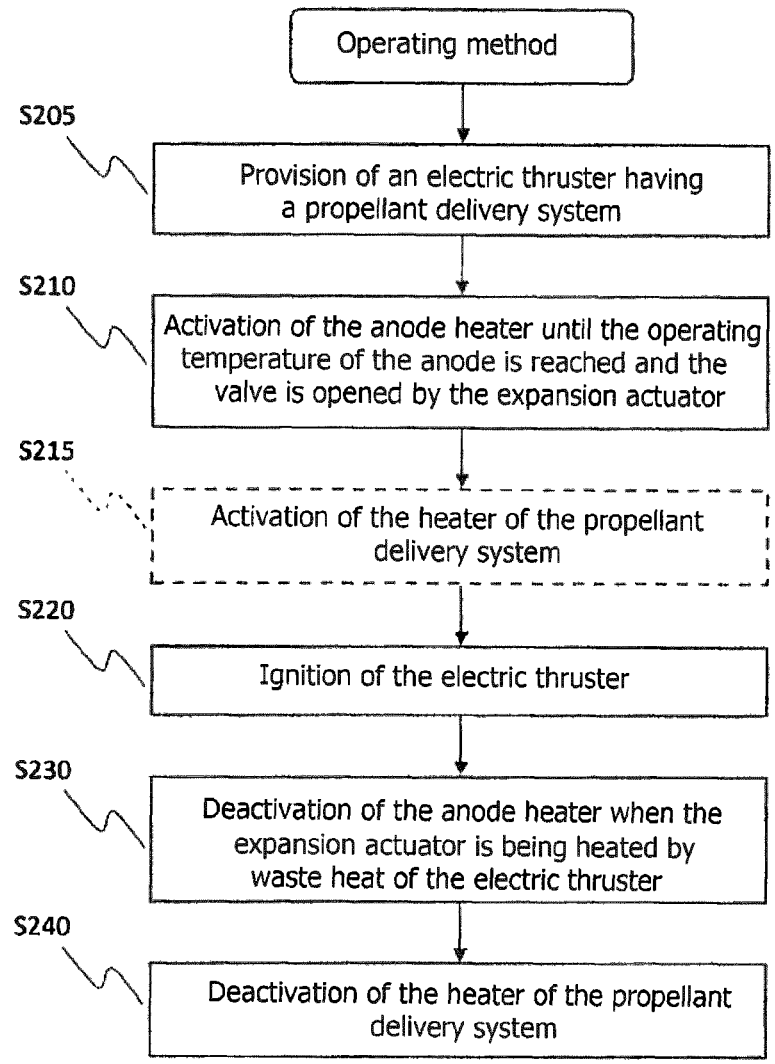
FIG. 5 shows a flow diagram according to a method of operating an electric thruster of an aerospace system.

Operation of the electric thruster is explained in greater detail with reference to FIGS. 2 to 5. FIG. 5 shows a flow diagram according to a method of operating an electric thruster of an aerospace system, while FIGS. 2 to 4 show the electric thruster in different states and the heat flows prevailing therein. For this purpose, an electric thruster having a propellant delivery system 10 is provided is step S205.

Firstly, in step S210, the anode heater 112 is activated until the anode has reached an operating temperature and the expansion actuator 106 has opened the valve 105. FIG. 2 shows, schematically, the heat flows during this start phase as arrows. As is also shown in FIG. 1, the valve 105 is closed. The end of the discharge chamber 30 and optionally the anode 40 are heated via the thermally conductive element/insulator 50.

As well as heating the element/insulator 50, the anode heater 112 also heats the expansion actuator 106 and optionally also the valve 105. The expansion material in the actuator 106 is thereby activated, so that the valve 105 is actuated, that is to say, the valve 105 is moved from a closed position into an open position. The volume or mass flow of the propellant through the pipe 100 of the propellant delivery system 10 is thereby enabled.

In addition, in a step S215 (FIG. 5), the heater 110 of the propellant delivery system 10 can be activated. The propellant in the tank 20 is heated via the heater 110 in the tank 20 (in/on the pipe 100) and sublimes. The heat flows (thermal radiation) of the heater 110 are likewise shown by arrows in FIG. 2. Owing to the expansion of the propellant in the gaseous state, the propellant flows in the direction towards the valve 105.

The sequence of steps S210 and S215 is not limited to the sequence shown in FIG. 5. The heater 110 of the propellant delivery system 10 can, of course, also be activated first, followed by the anode heater 112. Both heaters 110, 112 can also be activated at the same time.

When the valve 105 is open as a result of being actuated by the expansion actuator 106 (step S210), the gaseous propellant flows from the tank 20 via the pipe 100, the valve 105 and an opening in the further element/insulator 50 (optionally through the filter 60) into the discharge chamber 30. This state is shown in FIG. 3. The electric thruster depicted in FIG. 3 corresponds to the electric thruster of FIG. 1, except that the expansion actuator 106 has opened the valve 105 fully.

If gaseous propellant is flowing from the tank 20, the electric thruster can be ignited in step S220 (FIG. 5). To that end, the gaseous propellant in the discharge chamber 30 is ionized (for example by means of anode 40), accelerated and ejected from the opening of the discharge chamber 30 shown at the bottom in FIGS. 1 to 4. Operation of the electric thruster produces waste heat, which is delivered by the discharge chamber 30 and optionally the anode 40.

The heat flows during operation are shown as arrows in FIG. 4. The waste heat from the electric thruster is transmitted on the one hand into the element/insulator 50. As well as the opening in the element/insulator 50, the valve 105 and the filter 60 are also heated, in order to ensure that propellant does not condense and only gaseous propellant reaches the electric thruster. Thermal energy is also transmitted via the thermally conducting element/insulator 50 to the expansion actuator 106. As a result, in a step S230 (FIG. 5), the anode heater 112 can be deactivated since the expansion actuator 106 continues to be activated solely by the waste heat of the electric thruster. The element/insulator 50 and optionally the filter 60 also continue to be heated and ensure a constant delivery of propellant to the discharge chamber 30.

Depending on the arrangement of the at least one tank 20, waste heat (thermal energy) of the electric thruster can be transmitted via the discharge chamber 30 and/or the anode 40 and/or the element/insulator 50 into the tank 20 and thus to the propellant. The propellant so heated can more easily be sublimed by the heater 110 of the propellant delivery system 10, so that the power consumption of the heater 110 is reduced and the energy efficiency of the system as a whole is improved.

The system as a whole is so designed that the heater 110 in the tank 20 must be operated in order to prevent positive back-coupling of the system. In other words, the heater 110 must be designed subcritically. As a result, for switching off the electric thruster, the heater 110 can be deactivated in a step S240 (FIG. 5). By interrupting the heat flow from the heater 110 to the propellant in the tank 20, the production of gaseous propellant (for example by sublimation) of the propellant is reduced or terminated completely. In any case, the reduction in the amount of propellant which reaches the discharge chamber 30 causes a reduction in the output and thus the waste heat of the electric thruster, which leads to a further reduction in the heat input into the propellant in the tank 20.

Correspondingly, the thrust performance is controlled during operation of the electric thruster by the mass flow of propellant leaving the tank 20. This is substantially proportional to the heat output of the heater 110 situated in the tank 20. The greater the heat output into the tank, the more gaseous propellant (for example as a result of greater sublimation) is transported to the anode. Alternatively, the thrust performance of the electric thruster can be reduced and stopped by correspondingly controlling (including terminating) the production of electric and/or magnetic fields. In addition, the valve 105 is closed by (natural and/or active) cooling of the expansion actuator 106, so that the flow of propellant from the tank 20 is reduced and terminated. Finally, the thruster extinguishes completely.

Finally, it should be pointed out, in particular, that the exemplary implementation variants and embodiments discussed above serve merely for describing the claimed teaching and do not limit it to the exemplary implementation variant and embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electric thruster of an aerospace system, comprising:
   a propellant delivery system;
   at least one tank which is adapted to receive propellant for the electric thruster; and
   a discharge chamber,
   wherein the propellant delivery system comprises:
      a pipe for carrying propellant,
      a valve which is adapted to adjust a volume or mass flow of the propellant in the pipe, and
      an expansion actuator which is adapted to actuate the valve for adjusting the volume or the mass flow of the propellant, wherein the at least one tank at least partially encloses at least one of an end of the discharge chamber or an element thermally coupled with the discharge chamber,
wherein the valve of the propellant delivery system is arranged between the at least one tank
and the end of the discharge chamber wherein at least one of:
the element thermally coupled with the discharge chamber is a thermally conducting pipe for carrying the propellant to the discharge chamber or a portion of the pipe
of the propellant delivery system, or
the electric thruster further comprises:
an anode; and
a thermally conducting insulator which is coupled with the anode,
wherein the element thermally coupled with the discharge chamber comprises the thermally conducting insulator, and wherein the thermally conducting insulator comprises an opening for carrying propellant to the anode,
an anode heater which is configured to heat the anode for ignition of the electric thruster,
wherein the anode heater is so configured and so arranged that the anode heater heats the expansion actuator of the propellant delivery system indirectly or directly, so that the expansion actuator actuates the valve of the propellant delivery system and enables the volume or mass flow of the propellant through the pipe of the propellant delivery system.

2. The electric thruster according to claim 1, wherein the propellant delivery system further comprises:
a pipe heater which is arranged at least one of in or around the pipe.

3. The electric thruster according to claim 2,
wherein the pipe of the propellant delivery system projects from the valve into the at least one tank, and
wherein heat generated by the pipe heater of the propellant delivery system is transmitted into the tank by radiation.

4. The electric thruster according to claim 1, wherein the at least one of the tank or the propellant delivery system is thermally coupled with at least one further waste-heat-generating element of at least one of the electric thruster or the aerospace system.

5. The electric thruster according to claim 1, wherein the propellant is iodine.

6. The electric thruster according to claim 1, wherein the valve or the expansion actuator of the propellant delivery system is arranged at least one of in or on the insulator.

7. The electric thruster according to claim 1, wherein the expansion actuator comprises paraffin, metal, oil or a bi-metal as an expansion material.

8. A method of operating an electric thruster of an aerospace system, wherein the method comprises:
providing the electric thruster according to claim 1;
activating the anode heater until the anode has reached an operating temperature and the expansion actuator has opened the valve in order to enable the volume or mass flow of the propellant from the pipe of the propellant delivery system to the anode;
igniting the electric thruster; and
deactivating the anode heater when the expansion actuator is being heated by waste heat of the electric thruster.

9. The method according to claim 8, further comprising:
activating a heater of the propellant delivery system, wherein the propellant in the tank is converted into a gaseous state by sublimation as a result of heat transfer by radiation from the heater.

10. The method according to claim 9, further comprising:
deactivating the heater of the propellant delivery system when the electric thruster is switched off.

11. An electric thruster of an aerospace system, comprising:
a propellant delivery system;
at least one tank which is adapted to receive propellant for the electric thruster; and
a discharge chamber,
wherein the propellant delivery system comprises:
a pipe for carrying propellant,
a valve which is adapted to adjust a volume or mass flow of the propellant in the pipe, and
an expansion actuator which is adapted to actuate the valve for adjusting the volume or mass flow of the propellant,
wherein the at least one tank at least partially encloses at least one of an end of the discharge chamber or an element thermally coupled with the discharge chamber,
wherein the valve of the propellant delivery system is arranged between the tank and the end of the discharge chamber,
wherein the propellant is iodine, and
wherein the propellant, through casting of the iodine, forms part of a structure of the tank.

* * * * *